Aug. 22, 1967 J. F. BOLTON 3,337,057
SETTLING TANKS FOR SEWAGE
Filed Aug. 16, 1965 5 Sheets-Sheet 2

INVENTOR:
JAMES F. BOLTON
BY
Breitenfeld & Lewis
ATTORNEYS

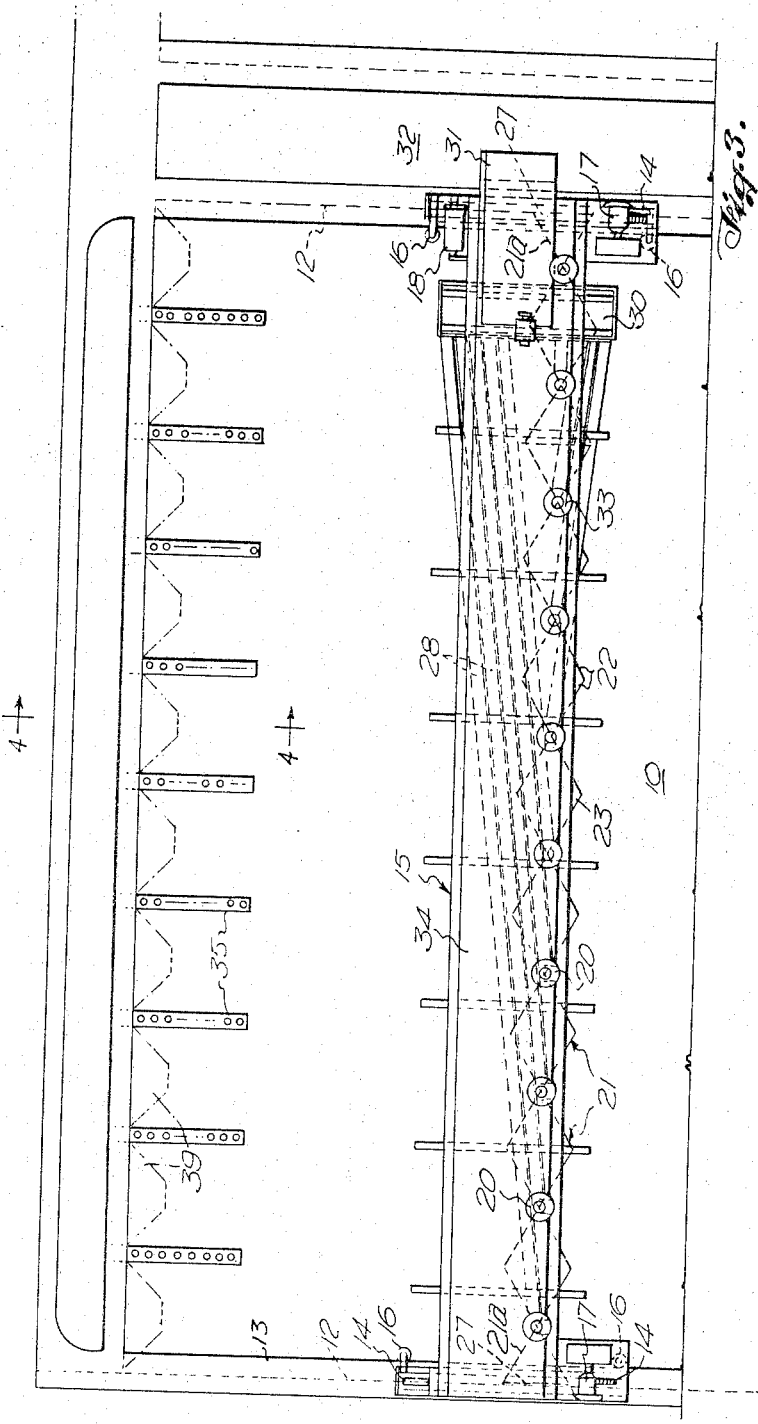

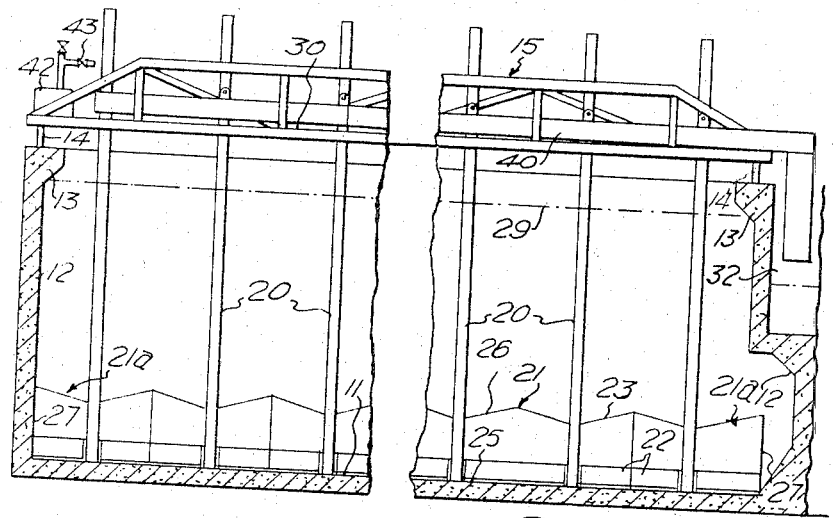
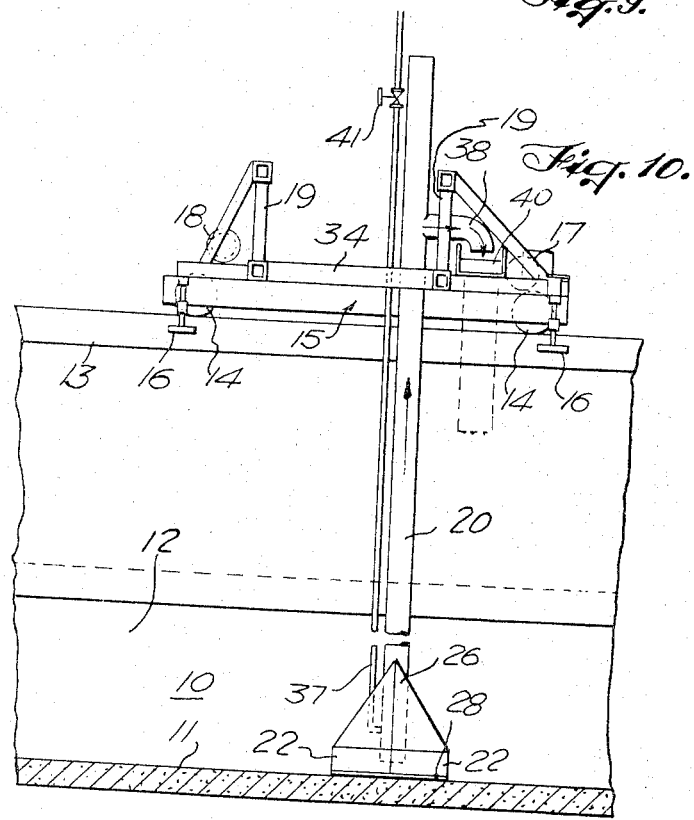

United States Patent Office 3,337,057
Patented Aug. 22, 1967

3,337,057
SETTLING TANKS FOR SEWAGE
James F. Bolton, 4 Norden Road, Heywood, England
Filed Aug. 16, 1965, Ser. No. 479,970
Claims priority, application Great Britain, Aug. 15, 1964, 33,414/64
2 Claims. (Cl. 210—527)

ABSTRACT OF THE DISCLOSURE

De-sludging arrangement for a settling tank including a bridge movable back and forth along length of tank. Draw-off pipes depend from bridge, and a floor scraper unit located between each two adjacent pipes.

Scraper unit includes vertical plates arranged in a diamond planform, pipes being at the corners of each scraper. Pyramidal superstructure joins upper edges of the plates. Pyramidal fillets at end walls of tank conform to profile of scraper assembly.

---

This invention relates to sludge collection and removal equipment for use in sewage settling tanks of rectangular planform, and is applicable, not only to the handling of the lighter sludges such as activated or humus sludge, but also the much heavier solid matter (primary sludge) which is produced from the settlement of screened crude sewage.

It is a well-known fact that, following the settlement of activated or humus sludge, it is essential that removal of the sludge from the tank floor should take place as rapidly as possible to avoid septicity or denitrification occurring. Furthermore, the collection means must be gentle, but efficient, in action so that all the sludge presented thereto is effectively removed from the floor of the tank with minimal disturbance of the near-quiescent conditions applying within the latter.

In one highly successful and hence acceptable method of removing the aforesaid light sludges, a flat-floored circular tank is provided with a central circular stationary drum perforated to allow the mixed liquid or effluent from the secondary treatment process to be admitted to the tank. This drum is so constructed that it also supports the inner end of a rotating bridge from which a continuous row of V-shaped scrapers is suspended by means of vertical pipes, the clarified effluent escaping over a weir around the tank, whilst the slude collected from the floor of the latter by the scrapers is drawn off under hydrostatic head to a sight-box on the bridge for syphonic return therefrom to an aeration or primary tank, as the case may be.

Rectangular settling tanks have hitherto been used chiefly for the settling-out of primary (crude) sludges, the scraper equipment usually comprising a boom formed from a flat plate which is supported vertically, or nearly vertically, across the full width of the tank from a suitable travelling bridge structure with two wheels at each end which run upon the longitudinal walls of the tank. Alternatively, the scraper boom is caused to traverse the length of the tank by means of an endless chain arrangement operated by an electric motor and drive unit at coping level, so that the boom pushes the sludge before it towards the end of the tank, where there is normally provided a collection channel or hopper for reception of the sludge and from which it is withdrawn by hydrostatic or other means.

Irrespective of the type of sludge to be removed, there is a tendency for it to bank up against the face of the boom and eventually to overflow the latter, thus necessitating frequent operation of the scraper means to ensure that all the sludge is swept into the aforesaid collection channel or hopper.

An important factor in selecting the shape of tank to be employed is the area of land available, since it will be appreciated that, for a given volume of liquor or effluent to be settled, rectangular tanks require the occupation of much less land than do circular tanks.

The improved equipment hereinafter described allows effective desludging of a flat-floored rectangular tank, irrespective of the type of sludge being handled.

According to this invention, I provide, for sweeping the floor of a sewage settling tank, a plurality of sludge scrapers mounted between the extremities of consecutive dependent draw-off pipes arranged in a row across said tank and each comprising two opposed pairs of mutually-divergent vertical plates which may be joined together at their free ends and united at their upper edges to a pyramidal superstructure, or alternatively connected together with their free ends in spaced overlapping relationship.

The resultant assembly is symmetrical about a plane containing the axes of the several draw-off pipes, so that it is equally effective when traversed in either direction at right angles to its length.

In the accompanying drawings

FIG. 3 is a plan view of the same, showing one end of the tank; and

Figure 1:
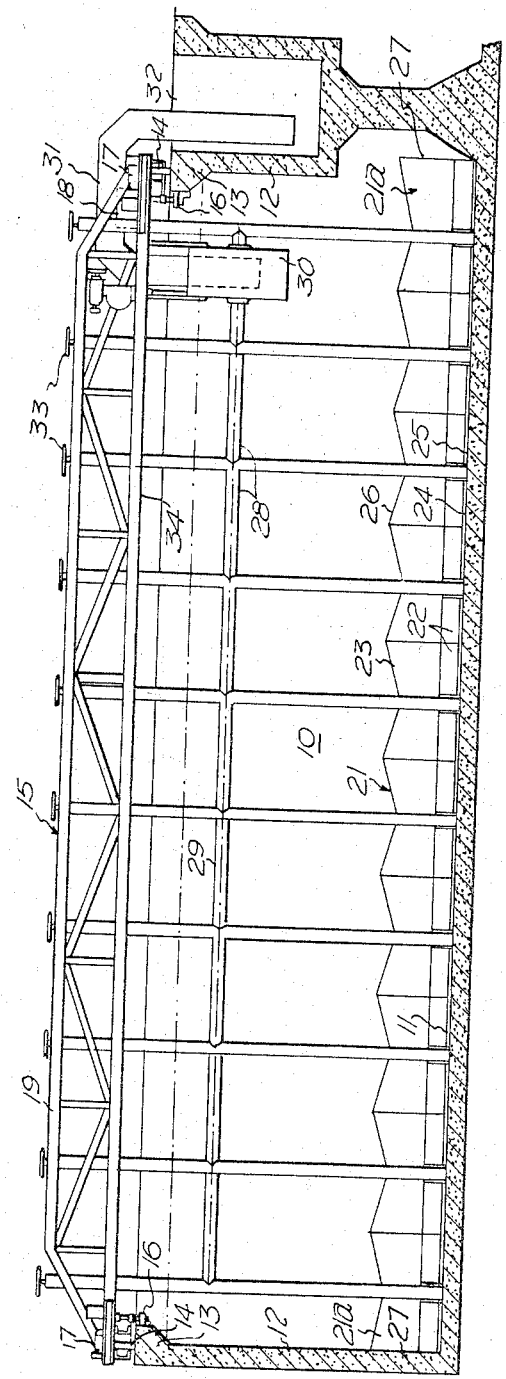
FIG. 1 is a front elevation of one form of desludging equipment according to the present invention for use in a rectangular settling tank.
Figure 2:
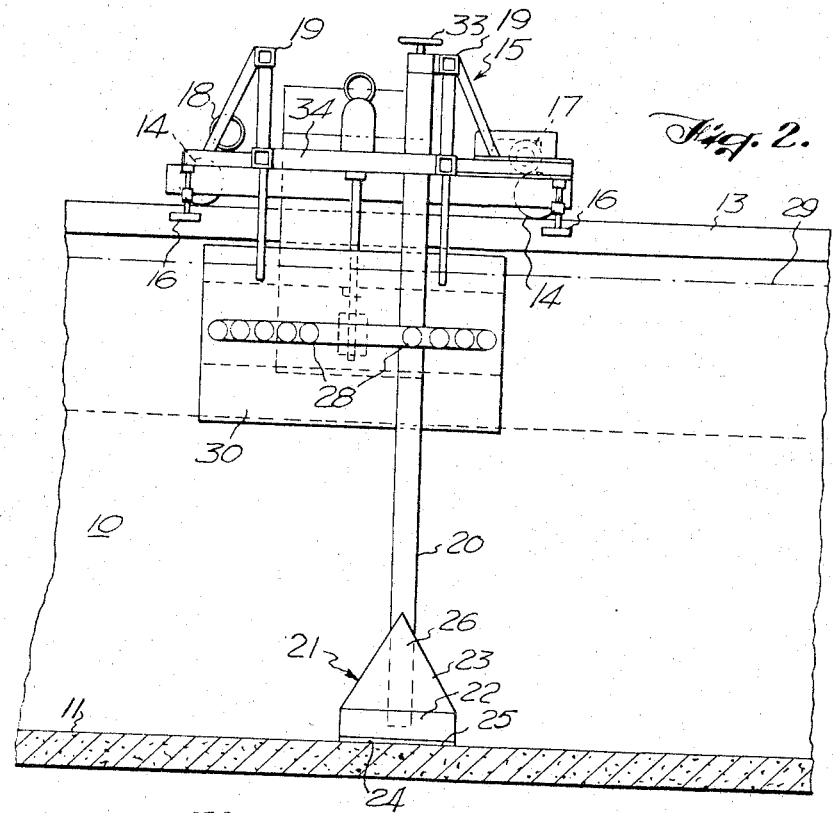
FIG. 2 is a side elevation of the equipment.
Figure 5:
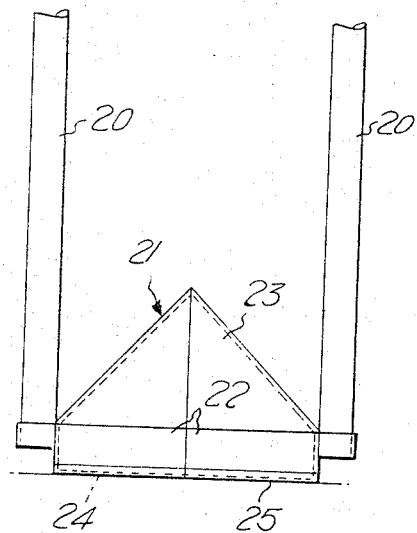
Figure 6:
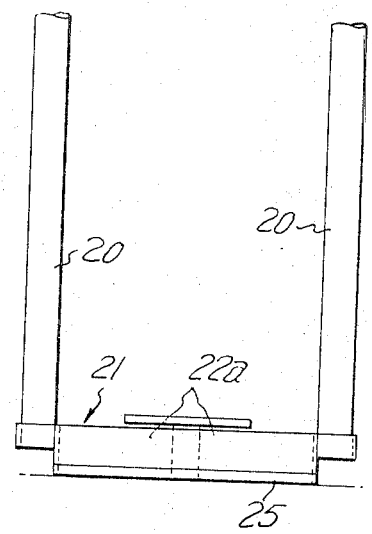
Figure 7:
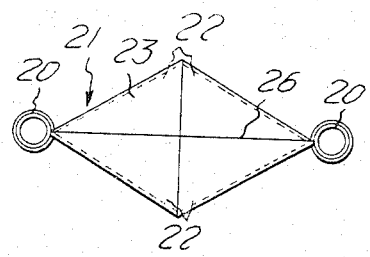
Figure 8:
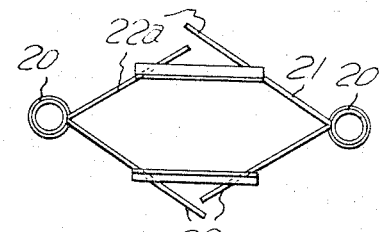

FIGS. 5 and 6 are front elevations of sludge scrapers alternative to those shown in FIGS. 1 to 3; and FIGS. 7 and 8 are plan views of the scrapers shown in FIGS. 5 and 6 respectively;

FIGS. 9 and 10 are views corresponding to FIGS. 1 and 2 respectively, but showing the invention applied to a sedimentation tank.

In the example illustrated in FIGS. 1 to 4, a settling tank 10 of rectangular planform, and of a length in the region of four times its width, is constructed with a flat horizontal floor 11 and vertical side walls 12, whose copings 13 provide runways for supporting wheels 14 at opposite ends of a transverse bridge 15.

Conveniently each end of the bridge 15 is mounted on two wheels 14 arranged in tandem and having tyres of a resilient plastics material (as described in British Patent No. 1,024,522), lateral guidance of the bridge during its traversing movement along the tank 10 being effected by similarly-tyred wheels 16 mounted horizontally to cooperate with the inner sides of the tank copings 13. Alternatively, of course, the conventional flanged metal wheels may be used in conjunction with rails laid along the tank copings.

One supporting wheel 14 at each end of the bridge 15 may be driven by its own electric motor 17 fed through a trailing cable which is automatically reeled on or off a drum 18 as the bridge traverses along the tank 10, but if the span of such bridge is not too great, it may be preferred to drive both ends thereof from a centrally-arranged motor.

The bridge 15 may be constructed as a girder truss the side members 19 of which have attached thereto the upper ends of vertical draw-off pipes 20 extending adjacent the tank floor 11 and arranged at regular intervals with their axes in a common plane. There may be (say) ten such pipes in the case of a tank 60 feet wide.

Between each pipe 20 and the next, and attached thereto, is a scraper unit 21 fabricated from four vertical plates 22 arranged to form a diamond pattern in plan view and united at their upper edges to a pyramidal superstructure 23 the inclined faces of which are at such an angle that sludge cannot settle upon them. The unit 21 is also completely plated-in at the base 24 so that sludge cannot collect within it, and its four lower edges are provided with replaceable rubber blades 25.

For a scraper unit 5 feet 4 inches long by 3 feet 6 inches wide and having vertical faces 1 foot high, a convenient overall height is 3 feet 9 inches, but instead of the longitudinal ridge-line 26 of the superstructure 23 meeting the draw-off pipes 20 at a height of (say) 3 feet above the tank floor 11 as shown in FIGS. 1 to 3 it may present an inverted V of smaller angle and descend to the upper edges of the vertical plates 22 at each end as in FIGS. 5 and 7.

The endmost of the draw-off pipes 20, which terminate (say) 6 inches clear of the tank floor 11, carry half-units 21a with closed ends 27, so that, from whichever side the assembly is viewed, each pipe 20 is situated at the angle of a re-entrant V subtending some 120 degrees.

On advancement of the bridge 15 in either direction, the vertical plates 22, defining oppositely facing pockets having opposed diverging walls, direct all collected sludge towards the mouth of the draw-off pipe 20 up which it is caused to flow by hydrostatic or air pressure-assisted means.

In the modification shown in FIGS. 6 and 8, the pyramidal superstructure 23 is omitted and each scraper 21 comprises two opposed pairs of mutually divergent plates 22a which are edged with replaceable rubber blades 25 as aforesaid and connected together with their free ends in spaced overlapping relationship. Scraper units of this form are much more economical to manufacture than those just described, but operate in the same manner, any sludge which penetrates between the overlapping plates 22a being continuously displaced as the scraper unit 21 moves along the tank 10.

When dealing with the lighter types of sludge the draw-off at each pipe 20 is conveniently effected in known manner under hydrostatic head, a slightly inclined branch pipe 28 below the liquid level 29 in the tank 10 leading into a sight-box 30 which is suspended from the bridge 15 and discharges through a syphon pipe 31 into a sludge channel 32 alongside the tank 10.

Each draw-off pipe 20 contains a valve mechanism 33 operable from the bridge walkway 34 so that the flow therethrough can be controlled.

Alternatively, some or all the draw-off pipes 20 may share a common connection to the sight-box 30, which may be provided with air-lift draw-off pipes as used in the sedimentation tank application hereinafter described, each pipe being arranged to discharge into a channel or duct extending lengthwise of the bridge structure 15 which in turn discharges the sludge directly into the collection channel 32 of the tank 10.

Figure 4:
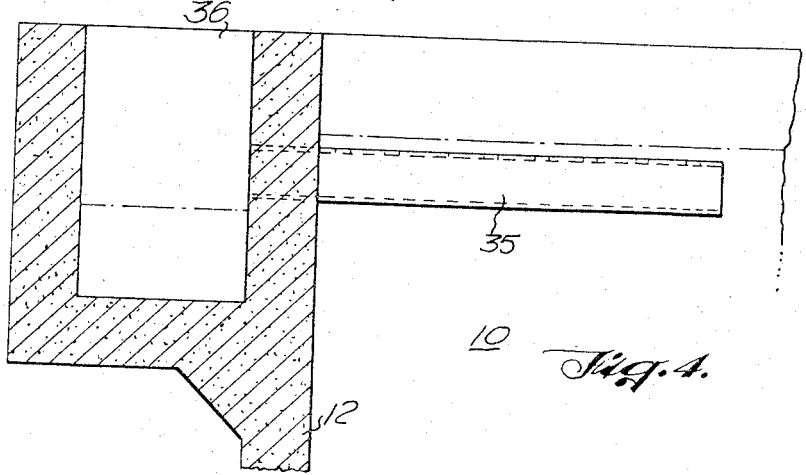
FIG. 4 is an enlarged section on the line 4—4 of FIG. 3.

As shown in FIGS. 3 and 4, the clarified effluent escapes from the tank 10 by means of perforated withdrawal pipes 35 projecting horizontally from one end thereof and opening into a further collecting channel 36 from which it flows by gravity, or is pumped, to a nearby river or stream in fully purified condition. Alternatively, or in addition, the effluent may pass into such channel by way of an overflow weir.

The improved scrapers 21 previously described are equally applicable to sedimentation tanks used for separating the primary sludge from crude sewage, the collected sludge in this case (FIGS. 9 and 10) being positively discharged by means of air-lift pumps 37 connected to the lower ends of the draw-off pipes 20 which discharge at 38 into an inclined pipe or channel 40 at bridge level leading the sludge directly into a collecting channel such as 32. The air supply of each pump 37 is controllable at 41 to vary the sludge drawn-off rate of the associated pipe 20 in relation to the amount of air supplied by the compressor 42, and thus ensure maximum consolidation of the delivery therefrom.

Although it is permissible to operate the scrapers 21 so that they traverse the tank 10 from end to end and then return, it is desirable, whatever the type of sludge being handled, to reduce to a minimum the time-intervals at which any given area of the tank floor 11 is swept by such scrapers.

This is conveniently effected by desludging for only a little more than half of the tank's length in each direction, the bridge's traverse being completed at a relatively high speed and with the desludging equipment inoperative.

The speed changes required are brought about automatically by suitable switch gear, each increase of speed being accompanied by a closing of the draw-off pipe valves 33 or (in the case of sedimentation tanks) by a shutting-off of the air supply to the pumps.

To ensure that the whole effective area of the tank floor 11 is swept, the dead spaces which would otherwise occur at each end thereof are occupied by pyramidal fillets 39 whose collective profile in plan view is complementary to that of the scraper assembly and whose side faces are sufficiently inclined to prevent lodgment of sludge particles thereon.

I claim:
1. A sewage settling tank of rectangular planform, in combination with de-sludging means comprising:
   a bridge spanning said tank,
   means for moving said bridge back and forth along the length of said tank,
   a row of sludge draw-off pipes depending from said bridge and terminating at their lower ends in a plane spaced slightly above the floor of said tank,
   means for drawing sludge through said draw-off pipes and depositing it in a suitable receptacle, and
   a floor scraper unit mounted between each two successive pipes, each floor scraper comprising:
      two opposed pairs of V-oriented vertical plates arranged in a diamond planform, the lower edges of said plates touching the tank floor,
      said pipes being arranged at the corners of each diamond shaped scraper, each pipe thereby being arranged at the apices of two oppositely facing pockets, the pockets having opposed diverging walls defined by said plates, whereby sludge is directed toward the lower ends of said pipes regardless of the direction in which said bridge moves.

2. The arrangement defined in claim 1 including a pyramidal superstructure joining the upper edges of said plates.

References Cited

UNITED STATES PATENTS

| 1,986,573 | 1/1935 | Hardinge | 210—527 |
| 2,922,524 | 1/1960 | Rankin | 210—528 X |

FOREIGN PATENTS

| 521,876 | 6/1940 | Great Britain. |
| 523,876 | 7/1940 | Great Britain. |

OTHER REFERENCES

New Type of Settling Tank for Activated Sludge, The Surveyor and Municipal County Engineer, May 26, 1939, page 696.

REUBEN FRIEDMAN, *Primary Examiner.*

J. DE CESARE, *Assistant Examiner.*